US010078333B1

(12) United States Patent
Bajracharya

(10) Patent No.: US 10,078,333 B1
(45) Date of Patent: Sep. 18, 2018

(54) EFFICIENT MAPPING OF ROBOT ENVIRONMENT

(71) Applicant: X Development LLC, Mountain View, CA (US)

(72) Inventor: Max Bajracharya, Millbrae, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 152 days.

(21) Appl. No.: 15/131,014

(22) Filed: Apr. 17, 2016

(51) Int. Cl.
G05D 1/02 (2006.01)
B25J 9/16 (2006.01)
G06K 9/00 (2006.01)

(52) U.S. Cl.
CPC .......... G05D 1/0214 (2013.01); B25J 9/1697 (2013.01); G05D 1/0251 (2013.01); G06K 9/00664 (2013.01); Y10S 901/01 (2013.01)

(58) Field of Classification Search
None
See application file for complete search history.

(56) References Cited

U.S. PATENT DOCUMENTS

| 5,347,459 | A | * | 9/1994 | Greenspan | B25J 9/1666 345/424 |
| 7,626,569 | B2 | * | 12/2009 | Lanier | G06F 1/1601 345/156 |
| 7,860,211 | B1 | * | 12/2010 | Annis | G01N 23/046 378/21 |
| 8,553,989 | B1 | | 10/2013 | Owechko et al. | |
| 8,847,954 | B1 | * | 9/2014 | Lin | G06T 7/55 345/424 |
| 9,443,309 | B2 | * | 9/2016 | Menashe | G06T 7/0044 |
| 9,530,101 | B1 | * | 12/2016 | Hyland | G06N 7/08 |
| 9,754,405 | B1 | * | 9/2017 | Young | G06T 15/08 |
| 2003/0156112 | A1 | * | 8/2003 | Halmshaw | G06T 15/08 345/424 |
| 2003/0214502 | A1 | * | 11/2003 | Park | G06T 15/205 345/420 |
| 2007/0116347 | A1 | * | 5/2007 | Hong | G06T 7/143 382/131 |
| 2007/0280528 | A1 | * | 12/2007 | Wellington | G05D 1/0274 382/154 |
| 2009/0171627 | A1 | * | 7/2009 | Olson | G06T 17/00 703/1 |

(Continued)

OTHER PUBLICATIONS

Marder-Eppstein et al. "The Office Marathon: Robust Navigation in an Indoor Office Environment." (2010). 8 pages.

(Continued)

Primary Examiner — Nicholas K Wiltey
(74) Attorney, Agent, or Firm — Middleton Reutlinger

(57) ABSTRACT

Methods, apparatus, systems, and computer-readable media are provided for efficient mapping of a robot environment. In various implementations, a group of data points may be sensed by a three-dimensional sensor. One or more voxels of a three-dimensional voxel model that are occupied by the group of data points may be identified. For each occupied voxel, a column of the three-dimensional voxel model that contains the occupied voxel may be identified. Occupied voxels contained in each column may be indexed by elevation. In various implementations, one or more sparse linked data structures may be used to represent the columns.

22 Claims, 6 Drawing Sheets

(56) References Cited

U.S. PATENT DOCUMENTS

| | | | | |
|---|---|---|---|---|
| 2009/0284537 | A1* | 11/2009 | Hong | G06T 1/60 345/522 |
| 2009/0295800 | A1* | 12/2009 | Vetter | G06T 15/08 345/424 |
| 2009/0326711 | A1* | 12/2009 | Chang | B25J 9/1666 700/248 |
| 2012/0033273 | A1* | 2/2012 | Klassen | H04N 1/6022 358/505 |
| 2012/0215351 | A1* | 8/2012 | McGee | B25J 9/1666 700/248 |
| 2012/0281907 | A1* | 11/2012 | Samples | G06K 9/00201 382/159 |
| 2014/0003695 | A1* | 1/2014 | Dean | G06T 7/0012 382/131 |
| 2014/0270476 | A1* | 9/2014 | Cameron | G06K 9/00201 382/154 |
| 2015/0228077 | A1* | 8/2015 | Menashe | G01S 5/163 382/103 |
| 2015/0371110 | A1* | 12/2015 | Hwang | G06K 9/6211 382/201 |
| 2016/0023352 | A1* | 1/2016 | Kennedy | B25J 9/06 700/259 |
| 2016/0109284 | A1* | 4/2016 | Hammershoi | G01H 7/00 73/586 |
| 2016/0151120 | A1* | 6/2016 | Kostrzewski | A61B 17/1671 606/130 |
| 2016/0300351 | A1* | 10/2016 | Gazit | G06T 7/11 |
| 2017/0013251 | A1* | 1/2017 | Thigpen | H04N 13/0493 |
| 2017/0154435 | A1* | 6/2017 | Bitter | G06T 7/11 |
| 2018/0058861 | A1* | 3/2018 | Doria | G01C 21/32 |

OTHER PUBLICATIONS

Bard et al. "Achieving Dextrous Grasping by Integrating Planning and Vision-Based Sensing." The International Journal of Robotics Research 14, No. 5 (1995): 445-464.

Teschner et al. "Collision Handling in Dynamic Simulation Environments." Eurographics Tutorials (2005): 79-185.

Lau, Boris. "Techniques for Robot Navigation in Dynamic Real-world Environments." PhD diss., 2013; 169 pages.

Nießner et al. "Real-Time 3D Reconstruction At Scale Using Voxel Hashing." ACM Transactions on Graphics (TOG) 32, No. 6 (2013): 169; 11 pages.

Häne et al. "Stereo Depth Map Fusion for Robot Navigation." In Intelligent Robots and Systems (IROS), 2011 IEEE/RSJ International Conference on, pp. 1618-1625. IEEE, 2011.

Ruhnke et al. "Compact RGBD Surface Models Based on Sparse Coding." In AAAI. 2013. 7 pages.

Lalonde et al. "Data Structure for Efficient Processing in 3-D." Robotics: Science and Systems Conference, 2005. 8 pages.

Vanneste et al. "3DVFH+: Real-Time Three-Dimensional Obstacle Avoidance Using an Octomap." 2014; 12 pages.

* cited by examiner

EFFICIENT MAPPING OF ROBOT ENVIRONMENT

BACKGROUND

A variety of techniques may be performed to determine positions and/or poses of robots. Some robots perform techniques such as simultaneous localization and mapping ("SLAM"). In other instances, techniques such as visual odometry and/or wheel odometry may be employed. Some robots may use an inertial measurement unit ("IMU") to determine their positions. To perform robot navigation, some robots and/or robot control systems construct and/or maintain a complete three-dimensional ("3D") model of an environment in which the robot operates. A robot may acquire data from a 3D laser scanner or other 3D vision sensor (e.g., stereographic camera) viewing a portion of the robot's environment and map such data to the complete 3D model. Some 3D models are formed as so-called "voxel-based" 3D environments in which a 3D grid of voxels are allocated. Data points sensed by one or more 3D vision sensors (also referred to as a "point cloud") are projected onto spatially-corresponding voxels. However, allocating memory for every voxel of the 3D grid, regardless of whether any data points sensed by the 3D sensor occupy those voxels, is inefficient both in terms of memory consumption and localization. In addition, standard ray-tracing techniques for determining whether dynamic objects remain in previously-detected locations may be computationally costly.

SUMMARY

The present disclosure is generally directed to methods, apparatus, and computer-readable media (transitory and non-transitory) for computationally-efficient perception and utilization of data points sensed by a 3D sensor of a robot to map a robot environment. In various implementations, a voxel-based 3D model of a robotic environment may be organized logically into columns, with the "floor" being organized into "tiles," and each tile being associated with a column. Data points sensed by a 3D vision sensor in the environment may be projected onto voxels of the model. The voxels may be grouped into the columns that contain them, and in many instances may be indexed within the columns by elevation. In some implementations, memory is only allocated (e.g., from the heap) for voxels that are "occupied" by at least a threshold number of data points sensed by the 3D vision sensor, and only those occupied voxels are added to columns. Other voxels may be deemed "unoccupied," and may not be allocated memory or added to columns. Consequently, the columns may form sparse data structures that include only occupied voxels. This gives rise to various technical advantages, such as reduced memory consumption compared to existing techniques in which memory is allocated for every voxel of the 3D grid, regardless of whether any data points actually occupy the voxel. Utilizing sparse features in accordance with various implementations described herein may also facilitate faster localization by robots, particularly compared to localization using comprehensive voxel-based models.

In various implementations, voxels may be organized into columns using various data structures. In some implementations, a linked data structure such as a linked list or binary tree may be generated for each column. Each node of the linked data structure may represent (e.g., include data associated with) an occupied voxel. Thus, for instance, each node may include statistics about data points contained within the voxel, which may be analyzed for purposes of surface identification, object detection, etc. In some implementations, nodes may be sorted within the linked data structure by elevation.

Organizing occupied voxels into columnar linked data structures gives rise to various technical advantages. For example, searching for particular occupied voxels becomes particularly efficient, especially where binary trees are employed as the linked data structure. In some implementations, a robot searching for a path through the environment may query the columnar linked data structures for occupied voxels within a particular range of elevations, such as voxels occupying space at a height of the robot and lower. The identified voxels may then projected down onto the tiles of the surface over which the robot travels. This enables the robot to efficiently compute and traverse a path through the environment.

Another technical advantage is that identifying objects that are potentially manipulable by the robot, such as objects on a table that the robot could pick up, becomes relatively inexpensive computationally. For example, if a large number of columns include voxels at the same elevation, and there are no voxels immediately above those voxels, those voxels likely contain data points that define a horizontal surface. If a smaller subset of the same columns include outlier voxels at a slightly higher elevation, those outlier voxels likely contain an object that rests on the surface that may be manipulated by the robot.

In some implementations, a computer implemented method may be provided that includes the steps of: receiving from a three-dimensional vision sensor of a robot, a group of data points sensed by the three-dimensional vision sensor; identifying one or more voxels of a three-dimensional voxel model that are occupied by the group of data points; identifying, for each occupied voxel, a column of the three-dimensional voxel model that contains the occupied voxel; and indexing voxels of the three-dimensional voxel model. The indexing may include indexing occupied voxels contained in each column by elevation without indexing one or more unoccupied voxels by elevation.

This method and other implementations of technology disclosed herein may each optionally include one or more of the following features.

In some implementations, the columns of the three-dimensional voxel model do not include unoccupied voxels. In some implementations, the indexing includes indexing each column exclusively by one or more elevations of one or more occupied voxels contained in the column.

In some implementations, the indexing may include generating, for each column of the three-dimensional voxel model that contains one or more occupied voxels, a linked data structure with one or more nodes representing the one or more occupied voxels contained in the column. In some implementations, the linked data structure may be a linked list. In other implementations, the linked data structure may be a binary tree that may or may not be searchable by voxel elevation. In some implementations, the nodes may be linked in order of elevation.

In some implementations, the method may include searching linked data structures associated with each column to identify voxels within a target elevation range, and operating, by the one or more processors, one or more portions of the robot to move along one or more paths that avoid voxels identified from the searching. In some implementations, data representing each voxel may include statistics about one or more data points contained in the voxel.

In various implementations, the method may include analyzing the statistics to identify a surface formed by the one or more data points contained in the voxel.

In some implementations, the method may further include identifying one or more of the occupied voxels that satisfy a criterion; projecting the one or more occupied voxels that satisfy the criterion onto a two-dimensional plane representing a surface navigable by the robot; and calculating a path across the surface for the robot to navigate, wherein the path avoids obstacles represented by the projected one or more occupied voxels. In some implementations, the criterion may include an elevation range that corresponds to at least a height of the robot.

In some implementations, the method may include allocating a greater amount of memory to store data representing each occupied voxel than is allocated to store data indicative of any unoccupied voxel of the three-dimensional voxel model. In other implementations, the method may include allocating memory from a heap to each occupied voxel. In some implementations, unoccupied voxels may not be allocated from the heap.

In various implementations, the method may further include classifying, as manipulable object voxels, one or more occupied voxels containing data points deemed to be associated with a manipulable object; obtaining, from the three-dimensional vision sensor, one or more up-to-date depth values associated with data points within the one or more manipulable object voxels; and determining that the manipulable object has moved based at least in part on the one or more up-to-date depth values.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
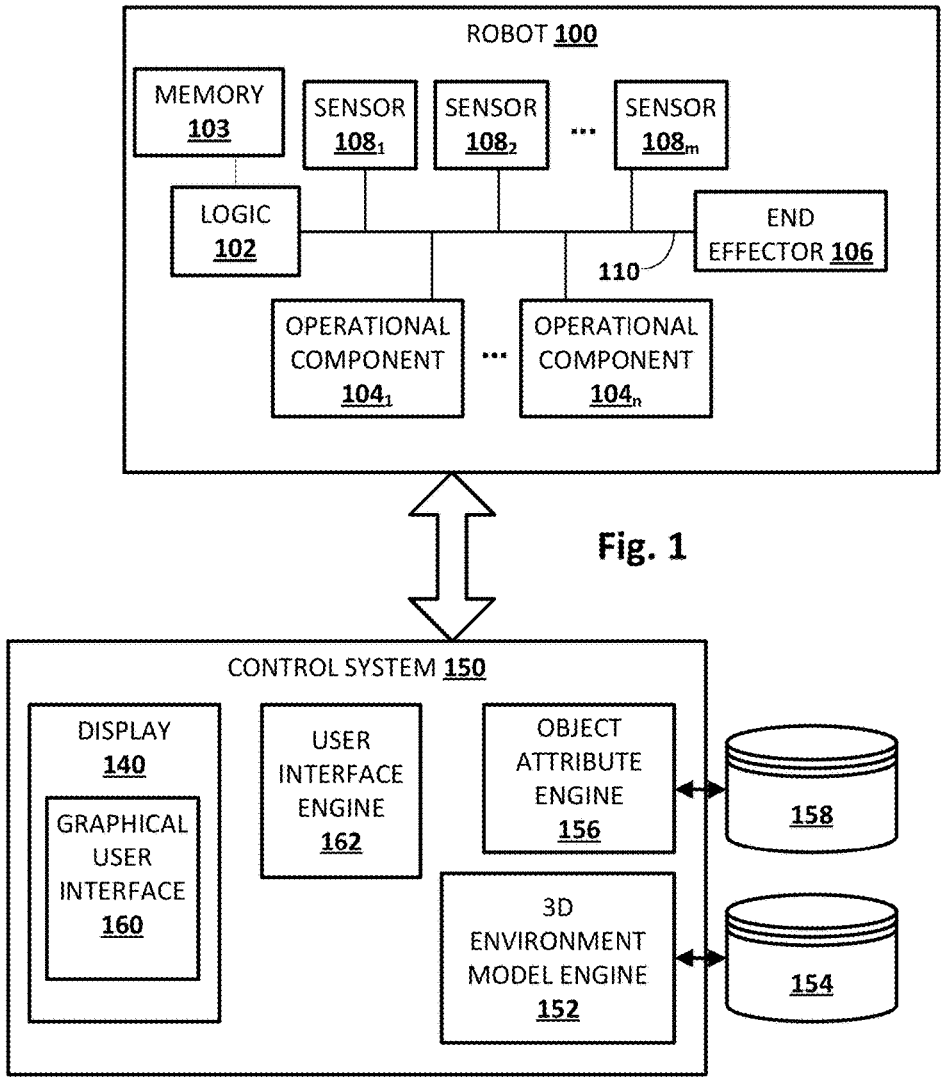
FIG. 1 schematically depicts an example environment in which disclosed techniques may be employed, in accordance with various implementations.

FIG. 1 is a schematic diagram of an example environment in which selected aspects of the present disclosure may be practiced in accordance with various implementations. A robot 100 may be in communication with a control system 150. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, a unmanned aerial vehicle ("UAV"), and so forth. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more operational components $104_{1-n}$, one or more end effectors 106, and/or one or more sensors $108_{1-m}$, e.g., via one or more buses 110. As used herein, "operational components" 104 of a robot may refer to actuators, motors (e.g., servo motors), joints, shafts, gear trains, pumps (e.g., air or liquid), pistons, drives, or other components that may create and/or undergo propulsion, rotation, and/or motion. Some operational components such as many joints may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances. Some robots, such as some telepresence robots, may not be equipped with end effectors. Instead, some telepresence robots may include displays to render visual representations of the users controlling the telepresence robots, as well as speakers and/or microphones that facilitate the telepresence robot "acting" like the user.

Sensors 108 may take various forms, including but not limited to 3D laser scanners or other 3D vision sensors (e.g., stereographic cameras used to perform stereo visual odometry) configured to provide depth measurements, two-dimensional cameras, light sensors (e.g., passive infrared), force sensors, pressure sensors, pressure wave sensors (e.g., microphones), proximity sensors (also referred to as "distance sensors"), depth sensors, torque sensors, bar code readers, radio frequency identification ("RFID") readers, radars, range finders, accelerometers, gyroscopes, compasses, position coordinate sensors (e.g., global positioning system, or "GPS"), speedometers, edge detectors, and so forth. While sensors 108₁₋ₘ are depicted as being integral with robot 100, this is not meant to be limiting. In some implementations, sensors 108 may be located external to, but may be in direct or indirect communication with, robot 100, e.g., as standalone units or as part of control system 150.

Control system 150 may include one or computing systems connected by one or more networks (not depicted) that control operation of robot 100 to various degrees. An example of such a computing system is depicted schematically in FIG. 6. In some implementations, control system 150 may be operated by a user (not depicted) to exert a relatively high level of control over robot 100, e.g., in real time in response to signals received by a user interface engine 162 and/or one or more readings from one or more sensors 108. In other implementations, control system 150 exerts less direct control over robot 100. For example, control system 150 may provide robot 100 with a high level task such as "go to location, identify person, follow person." Logic 102 on robot 100 may convert such high level tasks into robot action, e.g., by translating one or more high level tasks into a plurality of motion primitives executable by robot 100. In some implementations, control system 150 may include a display 140 (e.g., CRT, LCD, touchscreen, etc.) on which a graphical user interface 160 operable to remotely control robot 100 may be rendered.

Various modules or engines may be implemented as part of control system 150 as software, hardware, or any combination of the two. For example, in FIG. 1, control system 150 includes a 3D environment model engine 152, an object attribute engine 156, and the aforementioned user interface engine 162. 3D environment model engine 152 may be configured to maintain, e.g., in index 154, one or more 3D models of one or more 3D environments in which robot 100 operates. In some implementations, the models stored in index 154 may be so-called "voxel" based 3D models that include a 3D grid of voxels to represent the environment. In some implementations, a voxel-based 3D model of an environment may be organized within index 154 by columns. In some implementations, voxels may be indexed within each column by elevation, and in some instances the columns may be sparse data structures as described herein.

Object attribute engine 156 may be configured to store, e.g., in index 158, records of various objects that may be acted upon by robot 100. For example, object attribute engine 156 may store in index 158 one or more records of voxels classified as "manipulable object" voxels. Manipulable object voxels may include occupied voxels that contain data points deemed to be associated with a manipulable object. A "manipulable object" may be any object that can potentially be manipulated by robot. "Manipulation" of an object may refer to picking up the object, moving the object, altering one or more physical attributes of the object, altering an orientation of the object, and so forth. In various implementations, logic 102 of robot 100 and/or one or more components of control system 150, such as object attribute engine 156, may determine whether one or more manipulable objects have been moved, rearranged, or otherwise reoriented based at least in part on records in index 158.

While robot 100 and control system 150 are depicted separately in FIG. 1, this is not meant to be limiting. In various implementations, one or more aspects (e.g., modules, engines, etc.) depicted in FIG. 1 as implemented on one of robot 100 or control system 150 may be implemented on the other, may be distributed across both, and/or may be distributed across one or both in combination with other components not depicted in FIG. 1. In implementations where robot 100 and control system 150 are separate, they may communicate over one or more wired or wireless networks (not depicted) or using other wireless technology, such as radio, Bluetooth, infrared, etc. In other implementations, control system 150 may be implemented entirely or in part using logic 102 of robot 100.

Robot 100, and more particularly, logic 102, may be configured to make a variety of decisions based on data stored in indices 154 and 158. For example, suppose robot 100 is instructed to travel through a particular environment to a destination. Data about the environment stored in index 154 may be used by logic 102 to calculate a path through the environment that avoids known obstacles and/or hazards. Or, suppose robot 100 is instructed to move a table in a room. Logic 102 may determine based on data stored in index 158 that an object is on top of the table (at least as far as robot 100 is aware). Using that information, robot 100 may take appropriate action, such as by moving the table in a manner that avoids knocking the object off, by removing the object first before moving the table, or by refusing to move the table and raising an alert to one or more users about the object.

To make such decisions, robot 100 may access data stored in indices 154 and 158 in various ways. In some implementations, data stored in index 154 and/or index 158 may be synchronized to mirrored locations in memory 103 of robot 100 periodically (e.g., hourly, daily, every few minutes), e.g., as a batch download. In some implementations, data stored in index 154 and/or 158 may be made available to logic 102 of robot 100 on demand. Given the technical benefits attained by employing techniques described herein, such as conservation of memory and/or processor cycles, in some implementations, robot 100 may maintain (e.g., in memory 103) its own indices storing records of the environmental model and any obstacles or hazards.

Figure 2:
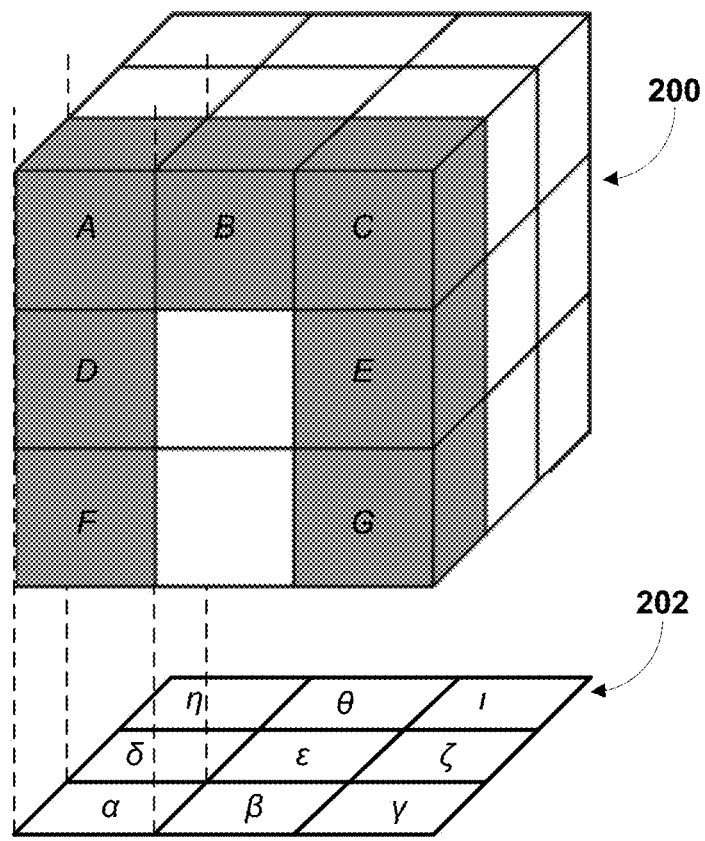
FIG. 2 depicts schematically a simple example of a voxel-based 3D environment, in accordance with various implementations.

FIG. 2 schematically depicts an example voxel-based 3D model 200 of an environment. For purposes of explanation, the model 200 consists of a simple cubic structure divided into twenty seven voxels. However, it should be understood that in real world models, the modeled environment would not necessarily (or even likely) be cubic, and that far more than twenty seven voxels would realistically be used to represent the environment. Indeed, by using linked data structures to define columns as described herein, it is possible to define environments of arbitrary heights. Schematically projected below the cubic structure is a three by three planar grid 202 of flat "tiles," labeled α-ι, each corresponding to a column of the model 200. An example column is depicted schematically rising up from the tile labeled "α."

In this example, seven voxels labeled A-G are pigmented to indicate that they have been deemed to be "occupied" voxels. In some implementations, occupied voxels in each column (i.e., above each tile) may be represented as a node in a linked data structure, such as a list of linked list pointers. In some implementations, a greater amount of memory may be allocated to store data representing each occupied voxel than is allocated to store data indicative of any unoccupied voxel of the three-dimensional voxel model. Thus, for example, in FIG. 2, each of the front three columns/tiles α-γ may have a linked list allocated in memory. The other six columns δ-ι, which contain no occupied voxels may be unpopulated (or from a memory standpoint, unallocated). Each of columns/tiles α and γ may be represented by, for instance, a linked list of three occupied voxels. In some implementations, the nodes of the linked list may be linked in order of elevation. For the column/tile β (i.e. the column with only the top voxel occupied), the linked list may include a single node to represent the single occupied voxel.

In other implementations, sufficient memory may be pre-allocated to a heap portion of memory 103 local to robot 100 to store voxels for an entire environment, or for a pertinent portion of the environment (e.g., the portion the robot is in or will be within to perform a task). Voxels may be pulled from and returned to the heap as needed.

Other types of linked data structures may be used to represent occupied voxels in each column. For example, in some implementations, a tree such as a binary search tree may be allocated for each column that contains one or more occupied voxels. In such a search tree, the nodes representing the voxels may be searchable by various aspects of the voxel, such as elevation.

Figure 3:
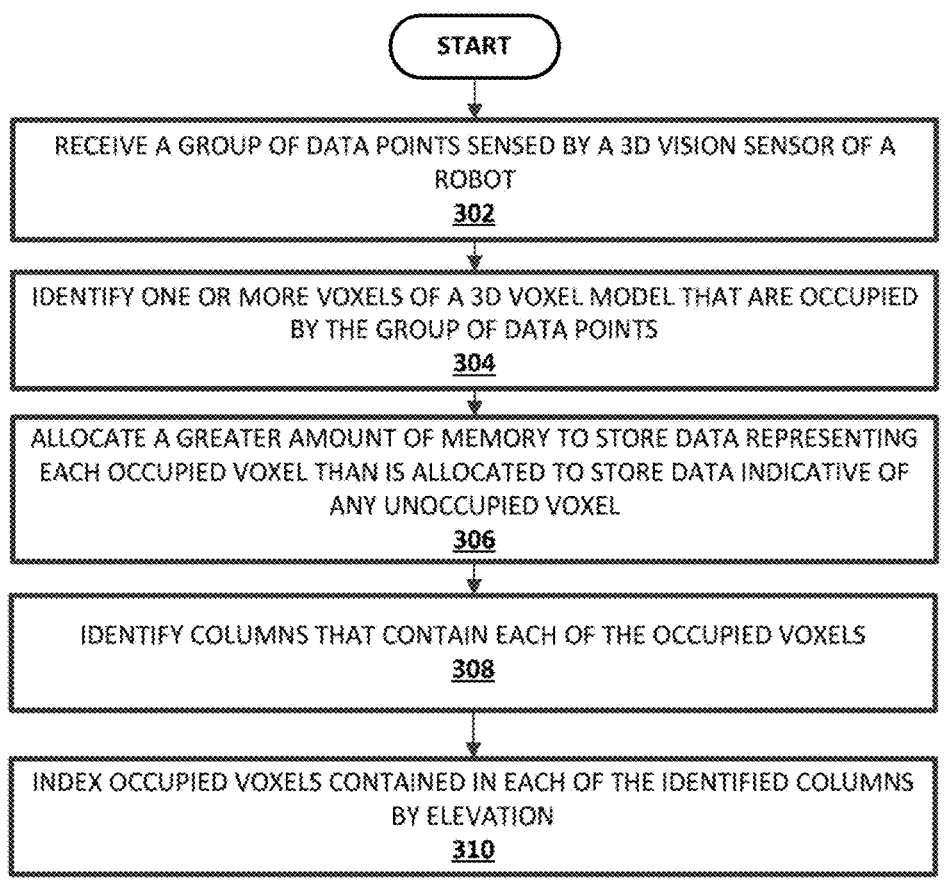
FIG. 3 depicts an example method for mapping a robot environment, in accordance with various implementations.

Referring now to FIG. 3, an example method 300 of generating a 3D model of a robotic environment is described. For convenience, the operations of the flow chart are described with reference to a system that performs the operations. This system may include various components of various computer systems. For instance, some operations may be performed at robot 100, while other operations may be performed by one or more components of control system 150. Moreover, while operations of method 300 are shown in a particular order, this is not meant to be limiting. One or more operations may be reordered, omitted or added. At block 302, the system may receive, e.g., from a three-dimensional vision sensor of robot 100, a group of data points sensed by the three-dimensional vision sensor. Each of these data points may include, among other things, a sensed depth and/or other data such as color data (e.g., red, green, and blue values).

At block 304, the system may identify one or more voxels of a three-dimensional voxel model that are occupied by the group of data points. For example, in some implementations, the system may project the group of data points onto voxels of the 3D model to determine which voxels contain at least a threshold number of data points. In some implementations, only a single data point needs be contained in a voxel in order for that voxel to be deemed "occupied." In other implementations, a voxel may be deemed "occupied" where, for instance, a threshold number of data points are contained in the voxel. In some implementations, various statistics about one or more data points in a voxel, such as how evenly the data points are distributed within the voxel, whether all the data points are skewed towards one side of the voxel, etc., may be considered when deciding whether the voxel should be deemed occupied.

In some implementations, at block 306, the system may allocate a greater amount of memory to store data representing each occupied voxel than is allocated to store data indicative of any unoccupied voxel of the three-dimensional voxel model. For example, as described above, unoccupied voxels may not be allocated any memory, or only enough memory to link to an occupied voxel at a higher elevation.

In other implementations, a maximum amount of voxels applicable to the local environment may be allocated in the heap of a robot's volatile memory (e.g., RAM). When a voxel is needed (e.g., threshold number of data points are detected within the voxel), the voxel may be pulled from the heap. Likewise, when a voxel is no longer needed, it may be returned to the heap. Using the heap in this manner enables a robot (or a robot controller) to limit a total amount of memory it uses, which may reduce the likelihood of the robot hanging or crashing due to running out of memory.

At block 308, the system may identify, for each occupied voxel, a column of the three-dimensional voxel model that contains the occupied voxel. This may be based on, for instance, x and y values associated with the data point. At block 310, the system may index occupied voxels contained in each column by elevation. For example, as described above, a linked data structure may be linked in order of elevation.

In order for robot 100 to be able to operate in real time or near real time (e.g., at 10 Hz), memory 103 may be preserved in various ways. For example, and as described above, logic 102 may allocate memory to linked data structures only for those columns that contain one or more occupied voxels. Additionally or alternatively, the system may allocate a linked data structure to each column, regardless of whether the column is occupied, but may only allocate memory for occupied nodes, e.g., such that an empty column only contains a link to NULL.

Various types of data may be stored in association with each voxel node. In some implementations, all data points contained within a voxel may be stored in association with the node. However, storing all data points in all occupied voxels may still put considerable strain on the sometimes limited resources of a robot. Moreover, the robot may not necessarily need such granular level of detail to perform various tasks, such as path planning. It may be enough for the robot to know generally where occupied voxels are located, so that the robot can operate (e.g., in real time) in a manner that avoids colliding with occupied voxels.

Accordingly, in various implementations, data representing each voxel (i.e. data stored in association with each node of the linked data structure) may include statistics about one or more data points contained in the voxel. These statistics may come in various forms and may distill data points contained within a voxel down in various ways. For example, in some implementations, rather than storing full information (e.g., x,y,z coordinates) for each data point, the robot may store general statistics about all data points, such as 80% of the data points lie within a certain half or quadrant of the voxel. Statistics such as these may be analyzed, e.g., to identify a horizontal or vertical surface formed by the one or more data points contained in the voxel. In some implementations, a histogram of data points may be stored for each voxel.

Generating voxel-based 3D models of environments as described herein may give rise to a number of technical benefits. For example, robot 100 (or control system 150) may be able to quickly search (from a computational standpoint) a voxel-based 3D model of an environment so that a path through the environment can be calculated to avoid obstacles, etc. For example, in some implementations, robot 100 may project one or more occupied voxels that satisfy a criterion onto a two-dimensional plane representing a surface navigable by the robot, and may calculate a path across the surface avoids obstacles represented by the projected one or more occupied voxels. Robot 100 may then navigate the calculated path.

For example, suppose robot 100 has a height that is less than two voxels high as represented by 3D model 200 in FIG. 2. Accordingly, when moving through the environment modeled by 3D model 200, robot 100 may need to avoid columns/tiles α and γ because they include obstacles that would bar passage by robot 100. However, in addition to tiles δ-ι, which are empty, robot 100 also would not need to avoid tile β because the only occupied voxel in that column is at elevation three, which is above the robot's height.

Figure 4:
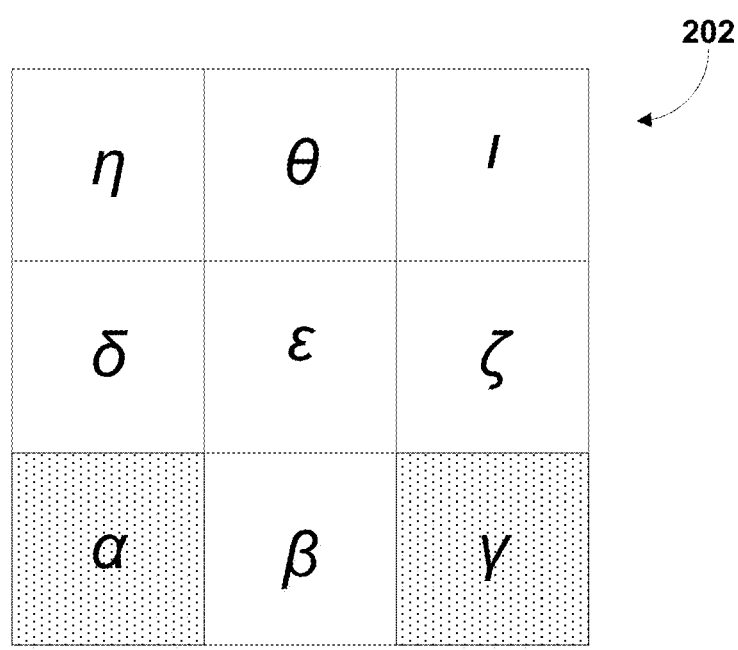
FIG. 4 depicts an example of a two-dimensional grid of "tiles" that may be utilized for robot navigation, in accordance with various implementations.

FIG. 4 depicts how the 3D model 200 of FIG. 2 may be projected down onto the two-dimensional grid of tiles in this scenario. The criterion that a voxel would need to satisfy in order to be projected downwards is that the voxel occupy space represented by a voxel with an elevation of one or two. Accordingly, only tiles α and γ are projected downwards (as represented by the shading). When planning a path through the environment, robot 100 need only take into account those two tiles, instead of considering all voxels of a 3D model of the environment, as might have been the case with conventional techniques.

Building a voxel-based 3D model of an environment as described above may also make segmentation—the process of identifying distinct objects within the environment—easier and/or more efficient. For example, segmentation may be used to identify objects that can be manipulated or otherwise interacted with by robot 100, such as objects on a table that robot 100 could pick up. If a large number of columns include voxels at the same elevation, those voxels likely contain data points that define a horizontal surface. If a smaller subset of the same columns include outlier voxels at a slightly (e.g., immediately) higher elevation, those outlier voxels may likely contain an object that rests on the horizontal surface that may be manipulated by robot 100.

Figure 5:
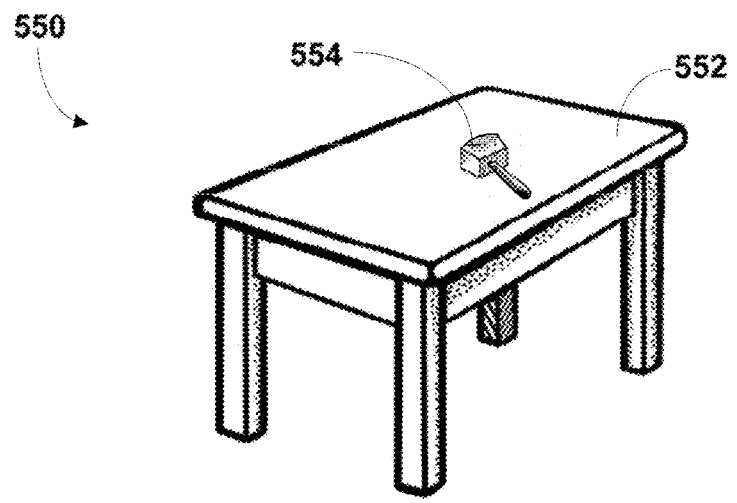
FIG. 5 depicts an example of how a real world environment may be mapped to a sparse, voxel-based 3D model using techniques described herein.
Figure 5:
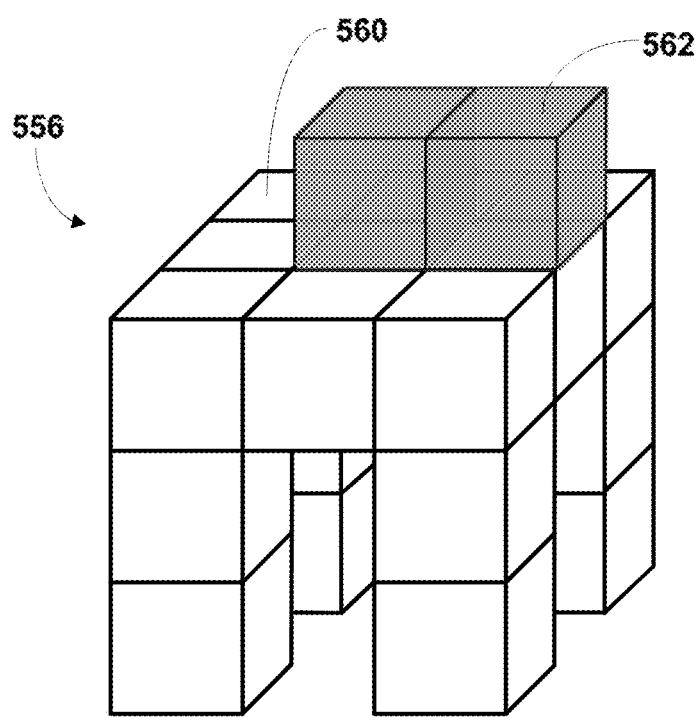

An example of this is depicted in FIG. 5, in which an example environment 550 includes a table 552 with a tool 554 placed on top. When a robot such as robot 100 enters environment 550, the robot may acquire a group of data points sensed by a three-dimensional vision sensor. The robot (or a control system associated with the robot) may then project these data points onto a new or existing voxel-based 3D model of the environment. An example voxel-based 3D model 556 demonstrating how the table 552 and tool 554 may be represented using techniques described herein is depicted at the bottom of FIG. 5. In this example, the tabletop projects to a horizontal surface 560 of voxels having equal elevation. The tool 554 projects onto two outlying voxels that are on top of tabletop 560.

The voxels of the model 556 that correspond to tool 554 are grayed in because they contain data points deemed to be associated with a manipulable object, in this instance, tool 554, and therefore have been classified as "manipulable object voxels." In some implementations, these voxels may have been classified as manipulable object voxels based at least in part on the fact that they represent two outliers from what otherwise appears to be a horizontal surface 560.

In some implementations, voxels may be classified as manipulable object voxels using other criteria. For example, in some robot environments, one or more robots may pass through the environment multiple times, each time conducting collecting new mapping data (e.g., using a 3D camera). As time goes on, the one or more robots may detect that some voxels have been occupied by data points for longer periods of time than others. Voxels may be classified as manipulable objects (or simply as dynamic objects) where, for instance, the voxels are observed less than a threshold amount of time. Other voxels that were observed from the beginning or for at least a threshold amount of time may be considered more permanent or semi-permanent, and hence in some implementations, less likely to be considered manipulable by the one or more robots.

In some implementations, robots (or control systems) may take advantage of the aforementioned 3D modeling techniques to determine when objects have been removed from, or moved within, an environment. Traditionally, robots perform ray tracing across all data points to determine whether objects are still in previously detected positions. Given the large number of potential data points that could be ray traced, this can be a computationally-costly method of ascertaining object removal. Instead, and in accordance with various implementations of the present disclosure, only data points occupying voxels previously deemed to be robot-manipulable objects may be examined. In some implementations, "back projection" may be employed to determine whether the manipulable objects underlying these voxels remain. For example, a robot may obtain, from a 3D vision sensor, one or more up-to-date depth values associated with data points within one or more voxels previously classified as manipulable object voxels. The robot may then compare these depths with "expected" depths (i.e. depths expected should the object still be present). If a sufficient proportion of the data point depths within the voxel differ from the expected depths, and particularly if the depths (e.g., distance from the robot) associated with these data points are greater than expected, then the robot may determine that the object has been moved and/or removed.

The techniques described herein are not limited to operation of robots. They may be equally applicable to visual interfaces for controlling and/or debugging robots, and more generally, to interfaces for roughly mapping an area. For example, disclosed techniques may be used to quickly and efficiently render, on a display device, a sparse 3D map of an environment. The map may have less detail than would be the case if a comprehensive 3D map of the environment was rendered, but the higher level of detail may not always be necessary or worth the computational costs.

For example, suppose a user is operating a graphical user interface to remotely navigate a telepresence robot through an environment. Suppose further that a network communication link between the user and the telepresence robot is spotty, slow, or otherwise unreliable. By reducing the environment in which the telepresence robot operates to sparse, columnar-based 3D models as described herein, the user may be presented with a simple-to-operate interface that omits many unnecessary details, potentially making navigation simpler for the user and preserving network resources such as bandwidth.

Figure 6:
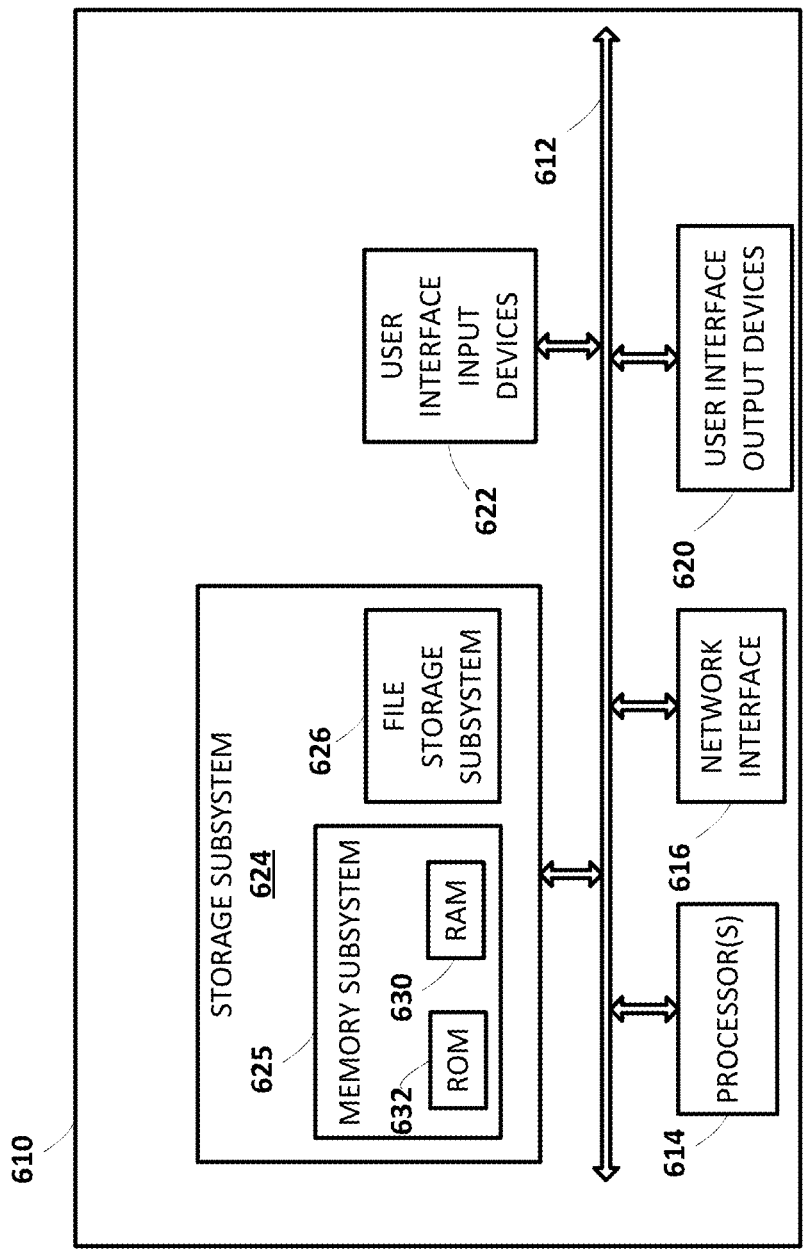
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 300, and/or to implement one or more aspects of robot 100 or control system 150. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
   receiving, by one or more processors, from a three-dimensional vision sensor of a robot, a group of data points sensed by the three-dimensional vision sensor;
   identifying, by the one or more processors, one or more voxels of a three-dimensional voxel model that are occupied by the group of data points;
   determining, by the one or more processors, for each occupied voxel, data representing the occupied voxel, wherein the data includes statistics about how a plurality of data points of the group of data points are spatially distributed within the occupied voxel;
   identifying, by the one or more processors, for each occupied voxel, a column of the three-dimensional voxel model that contains the occupied voxel; and
   indexing in memory, by the one or more processors the data representing voxels of the three-dimensional voxel model, the indexing comprising indexing, in the memory, the data representing occupied voxels contained in each column by elevation without indexing one or more unoccupied voxels by elevation.

2. The method of claim 1, wherein the indexing comprises generating, for each column of the three-dimensional voxel model that contains one or more occupied voxels, a linked data structure with one or more nodes representing the one or more occupied voxels contained in the column.

3. The method of claim 2, wherein the linked data structure comprises a linked list.

4. The method of claim 2, wherein the linked data structure is a binary tree.

5. The method of claim 4, wherein the binary tree is searchable by voxel elevation.

6. The method of claim 2, wherein the nodes are linked in order of elevation.

7. The method of claim 2, further comprising:
   searching, by the one or more processors, linked data structures associated with each column to identify voxels within a target elevation range; and
   operating, by the one or more processors, one or more portions of the robot to move along one or more paths that avoid voxels identified from the searching.

8. The method of claim 1, further comprising analyzing the statistics to identify a surface formed by the one or more data points contained in the voxel.

9. The method of claim 1, further comprising:
   identifying, by the one or more processors, one or more of the occupied voxels that satisfy a criterion;
   projecting, by the one or more processors, the one or more occupied voxels that satisfy the criterion onto a two-dimensional plane representing a surface navigable by the robot; and
   calculating, by the one or more processors, a path across the surface for the robot to navigate, wherein the path avoids obstacles represented by the projected one or more occupied voxels.

10. The method of claim 9, wherein the criterion comprises an elevation range that corresponds to at least a height of the robot.

11. The method of claim 1, further comprising allocating, by the one or more processors, a greater amount of memory to store data representing each occupied voxel than is allocated to store data indicative of any unoccupied voxel of the three-dimensional voxel model.

12. The method of claim 1, further comprising allocating, by the one or more processors, memory from a heap to each occupied voxel, wherein unoccupied voxels are not allocated from the heap.

13. The method of claim 1, further comprising:
classifying, by the one or more processors, as manipulable object voxels, one or more occupied voxels containing data points deemed to be associated with a manipulable object;
obtaining, by the one or more processors, from the three-dimensional vision sensor, one or more up-to-date depth values associated with data points within the one or more manipulable object voxels; and
determining, by the one or more processors, that the manipulable object has moved based at least in part on the one or more up-to-date depth values.

14. A robot comprising:
a three-dimensional vision sensor;
one or more processors operably coupled with the three-dimensional vision sensor; and
memory operably coupled with the one or more processors, the memory storing instructions that, when executed by the one or more processors, cause the one or more processors to:
receive, from the three-dimensional vision sensor, a group of data points sensed by the three-dimensional vision sensor;
identify one or more voxels of a three-dimensional voxel model that are occupied by the group of data points;
determine, for each occupied voxel, data representing the occupied voxel, wherein the data includes statistics about how a plurality of data points of the group of data points are spatially distributed within the occupied voxel;
identify, for each occupied voxel, a column of the three-dimensional voxel model that contains the occupied voxel; and
index, in the memory, the data representing voxels of the three-dimensional voxel model, wherein in indexing the voxels the one or more processors are to index, in the memory, the data representing occupied voxels contained in each column by elevation without indexing one or more unoccupied voxels by elevation.

15. The robot of claim 14, wherein the memory further comprises instructions that, when executed by the one or more processors, cause the one or more processors to generate, for each column of the three-dimensional voxel model that contains one or more occupied voxels, a linked data structure with one or more nodes representing the one or more occupied voxels contained in the column.

16. The robot of claim 15, wherein the linked data structure comprises a linked list.

17. The robot of claim 15, wherein the linked data structure is a binary tree that is searchable by voxel elevation.

18. The robot of claim 15, wherein the nodes are linked in order of elevation.

19. The robot of claim 14, wherein the memory further comprises instructions that, when executed by the one or more processors, cause the one or more processors to:
identify one or more of the occupied voxels that satisfy a criterion;
project the one or more occupied voxels that satisfy the criterion onto a two-dimensional plane representing a surface navigable by the robot; and
calculate a path across the surface for the robot to navigate, wherein the path avoids obstacles represented by the projected one or more occupied voxels.

20. The robot of claim 14, wherein the memory further comprises instructions that, when executed by the one or more processors, cause the one or more processors to:
classify, as manipulable object voxels, one or more occupied voxels containing data points deemed to be associated with a manipulable object;
obtain, from the three-dimensional vision sensor, one or more up-to-date depth values associated with data points within the one or more manipulable object voxels; and
determine that the manipulable object has moved based at least in part on the one or more up-to-date depth values.

21. The robot of claim 14 wherein the memory further comprises instructions that, when executed by the one or more processors, cause the one or more processors to allocate memory from a heap portion of the memory to each occupied voxel, wherein unoccupied voxels are not allocated from the heap portion of the memory.

22. At least one non-transitory computer-readable medium comprising instructions that, in response to execution of the instructions by a robot, cause the robot to perform the following operations:
receiving, from a three-dimensional vision sensor of the robot, a group of data points sensed by the three-dimensional vision sensor;
identifying one or more voxels of a three-dimensional voxel model that are occupied by the group of data points;
determining, for each occupied voxel, data representing the occupied voxel, wherein the data includes statistics about how a plurality of data points of the group of data points are spatially distributed within the occupied voxel;
identifying, for each occupied voxel, a column of the three-dimensional voxel model that contains the occupied voxel; and
indexing, in memory, the data representing the occupied voxels contained in each column by elevation without indexing one or more unoccupied voxels by elevation.

* * * * *